United States Patent [19]

Omoto et al.

[11] 3,773,533

[45] Nov. 20, 1973

[54] PROCESS FOR THE MANUFACTURE OF GYPSUM BOARD

[75] Inventors: Tsunehiko Omoto; Tadashi Inoue; Hironori Aizawa, all of Shimonoseki, Japan

[73] Assignee: Mitsui Toatsu Chemicals, Incorporated, Tokyo, Japan

[22] Filed: Oct. 4, 1971

[21] Appl. No.: 186,487

[30] Foreign Application Priority Data
Oct. 15, 1970  Japan................................. 45/90065

[52] U.S. Cl.................................... 106/110, 156/39
[51] Int. Cl............................................ C04b 11/00
[58] Field of Search................... 106/109, 110, 111; 156/39

[56] References Cited
UNITED STATES PATENTS

| | | | |
|---|---|---|---|
| 3,199,997 | 8/1965 | Johnson | 106/109 |
| 1,989,641 | 1/1935 | King | 106/110 |
| 3,486,965 | 12/1969 | Janninck | 106/110 |

*Primary Examiner*—James E. Poer
*Attorney*—Arnold B. Christen et al.

[57] ABSTRACT

A process for the manufacture of a gypsum board wherein α-type hemihydrate gypsum by-produced in the wet process of phosphoric acid manufacturing is ground and mixed with water and a metal ion of iron or aluminum to form an aqueous slurry containing said gypsum and said slurry is enclosed between two sheets of board paper while maintaining the pH value of said slurry at 4 to 7, thereby said slurry sets to form said gypsum board.

5 Claims, No Drawings

PROCESS FOR THE MANUFACTURE OF GYPSUM BOARD

This invention relates to an improved process for manufacturing a gypsum board from α-type hemihydrate gypsum which is by-produced in the wet process of phosphoric acid manufacturing.

Hitherto, there has been used as a starting material for manufacturing gypsum board dihydrate gypsum by-produced in the manufacture of phosphoric acid other than natural gypsum. The by-produced dihydrate gypsum is calcined at a temperature of 120° – 200° C to convert into a calcined gypsum, then ground finely up to a specific surface area more than 5,000 cm$^2$/g (Blaine value) and mixed with additives such as loading materials, blowing agent etc. and a suitable amount of water to form a slurry. The slurry is enclosed between two sheets of board paper. The resulting product is allowed to set, and, thereafter, it is dried to yield a gypsum board. The calcined gypsum formed in the above process is β-type hemihydrate having a porous structure, can be readily ground finely and has a large conversion velocity into dihydrate in the aqueous slurry in the process for the manufacture of gypsum board.

In the wet process of phosphoric acid manufacturing, such as the dihydrate-hemihydrate process which has been developed recently, calcium phosphate rock is decomposed with a mixture of sulfuric and phosphoric acid, the formed dihydrate gypsum is separated from the formed phosphoric acid, sulfuric acid or a mixture of sulfuric acid and phosphoric acid is added to the separated dihydrate gypsum, the resulting slurry is kept at a temperature above the transition point of dihydrate to hemihydrate in the presence of crystal seeds of hemihydrate gypsum to convert dihydrate gypsum contained in said slurry into hemihydrate gypsum, the hemihydrate gypsum is separated from the sulfuric acid-phosphoric acid mixture and the mixture is used for the decomposition of phosphate rock, α-type hemihydrate gypsum having 1/2 mol of crystallization water in a molecule instead of dihydrate gypsum is separated from the phosphoric acid solution.

If such α-type hemihydrate gypsum can be used for the manufacture of gypsum board as it is, the calcination step of dihydrate gypsum can be omitted which is understood as inevitable in the manufacture of gypsum board previously. However, the α-type hemihydrate gypsum contains impurities such as phosphoric acid and fluorides and has a compact crystalline structure, so that it has a small setting velocity and can not be used for the industrial production of gypsum board as it is.

For the industrial production of gypsum board, it is general to add a suitable amount of water to β-type hemihydrate gypsum with stirring, enclose the resulting aqueous slurry between two sheets of board paper running continuously on a belt conveyer and combine with the cover sheets by means of setting (dihydration) of hemihydrate gypsum for a very short time, e.g., 1 – 7 min. Accordingly, the small setting velocity of α-type hemihydrate gypsum by-produced in the wet process of phosphoric acid manufacturing is a fatal disadvantage from the industrial view-point for the use in the manufacture of gypsum board; that is, there takes place such a fatal disadvantage that the reduction of speed of belt conveyer in the industrial production of gypsum board, i.e., a remarkable reduction in the production capacity of gypsum board, may be brought about.

An object of this invention is to provide a process for the manufacture of gypsum board without the calcination step of dihydrate gypsum.

Another object of this invention is to provide an improved process for the manufacture of gypsum board with α-type hemihydrate gypsum, which is by-produced in the manufacture of phosphoric acid, at a high manufacturing velocity.

Further object of this invention is to provide a process for the manufacture of gypsum board without finely grinding starting α-type hemihydrate gypsum.

Still further object of this invention is to provide an improved process for the manufacture of gypsum board with saving heat for drying.

According to this invention, the following process for the manufacture of gypsum board is provided. In a process for the manufacture of gypsum board wherein α-type hemihydrate gypsum by-produced in the wet process of phosphoric acid manufacturing is ground and mixed with water to form a slurry and said slurry is enclosed between two sheets of board paper to set therebetween, the improvement which comprises making iron or aluminum ion exist in said slurry and maintaining the pH-value of said slurry at 4 to 7.

For making iron or aluminum ion exist in the slurry, a water soluble iron or aluminum salt is mixed with α-type hemihydrate gypsum prior to the formation of slurry containing α-type hemihydrate gypsum or added to an aqueous slurry containing α-type hemihydrate gypsum. As said water soluble iron or aluminum salt, there is used a salt of strong acid, e.g. sulfate, nitrate or chloride, and sulfate is most preferable. The amount of iron or aluminum salt added is preferably 0.3 – 3.0 parts by weight as hydrate to 100 parts by weight of α-type hemihydrate gypsum.

For the adjustment of pH-value of the aqueous slurry containing α-type hemihydrate gypsum to 4 to 7, preferably 4 to 6, a basic compound of alkali metal or alkaline earth metal is added to the starting α-type hemihydrate gypsum or to the slurry. As said basic compound of alkali metal or alkaline earth metal, there is used oxide, hydroxide or carbonate thereof and most preferably calcium compound such as calcium hydroxide. The amount of said compound added is in general preferably 0.05 – 0.5 part by weight per 100 parts by weight of α-type hemihydrate gypsum.

In this invention, it is important to present iron or aluminum ion in the aqueous slurry of α-type hemihydrate gypsum and keep the pH-value of the slurry at 4 to 7. As described hereinafter, only either the presence of iron or aluminum ion or the adjustment of pH-value of the slurry does not give any effect or industrial utility. That is, if iron or aluminum ion is present and the pH-value of slurry is not adjusted, the pH-value of the aqueous slurry is lowered further in connection with the fact that the pH-value of gypsum by-produced in phosphoric acid manufacturing is less than 3, causing the changing of color and the weakening of board paper and the reduction of strength of gypsum board itself. Further, nails for fitting rust disadvantageously in the use of gypsum board.

On the other hand, if the pH-value is adjusted to 4 to 7 in the absence of iron or aluminum ion, as obviously seen from the examples described hereinafter, the setting time of the aqueous slurry of α-type hemihydrate gypsum is greatly prolonged with the loss of adhesion to board paper and the reduction of strength. Potassium or sodium salts such as potassium or sodium sulfate, which have been used conventionally in the manufacture of gypsum board from β-type hemihydrate gypsum, do not provide effects as in this invention even if they are used respectively singly or after adjusting the pH-value of aqueous slurry within the range of 4 to 7 as in this invention.

In this invention, it is not necessary to grind finely the starting α-type hemihydrate gypsum to such an extent as in conventional processes. While β-type hemihydrate gypsum, which has been used previously, is finely ground in general up to a specific surface area more than 5,000 cm$^2$/g, it is sufficient according to the process of this invention to grind the starting α-type gypsum up to a specific surface area more than 2,500 cm$^2$/g, preferably of about 3,000 cm$^2$/g.

In the process according to this invention, there may be used additives such as known loading materials and blowing agents, which are used in the aqueous slurry in the manufacture of gypsum board conventionally.

According to this invention, α-type hemihydrate gypsum by-produced in the wet process of phosphoric acid manufacturing such as the dihydrate-hemihydrate process can be used very readily from the industrial viewpoint for the manufacture of gypsum board, so that the high temperature calcination step (calcined gypsum manufacturing step) of the starting gypsum is not required which has been previously understood as inevitable in the manufacture of gypsum board.

Further, while water for normal consistency (parts by weight of water amount per 100 parts by weight of hemihydrate gypsum required for the preparation of aqueous slurry of suitable consistency) of β-type hemihydrate gypsum is about 75 to 85, that of α-type hemihydrate gypsum is about 55 to 60. Therefore, the use of α-type hemihydrate gypsum can reduce about by 20 to 30% the amount of water required for the preparation of slurry of suitable consistency. Accordingly, the amount of water to be evaporated from the gypsum board moldings in the drying step of gypsum board is reduced about by 30 to 40 percent resulting in an improvement of production capacity of gypsum board plant.

Further, in this invention, α-type hemihydrate gypsum which is very difficultly finely ground compared with β-type hemihydrate gypsum is not subjected to the fine grinding and the setting velocity of α-type hemihydrate gypsum slurry is higher than that of conventional β-type hemihydrate gypsum slurry. Both the shortening of setting time and the reduction of the amount of water used, said reduction being resulted from the use of α-type hemihydrate gypsum in the manufacture of gypsum board, bring a large increase of production capacity per unit equipment. Further, the gypsum board obtained by this invention shows a superior adhesion of core gypsum to board paper and bending strength to those of gypsum board obtained by the conventional process using β-type hemihydrate gypsum.

According to this invention, the setting time of slurry of α-type hemihydrate gypsum by-produced in the manufacture of phosphoric acid may be equivalent to that in the use of β-type hemihydrate gypsum, so that the equipments for manufacturing gypsum board using β-type hemihydrate gypsum can be used in this invention as they are.

Examples according to this invention are described as follows, in which parts and per cents are shown by weight.

Example 1

A dried α-type hemihydrate gypsum by-produced in the wet process of phosphoric acid manufacturing according to the dihydrate-hemihydrate process was used. The α-type hemihydrate gypsum contained 6.43 percent of crystallization water, 0.15 percent of total phosphoric acid ($P_2O_5$), 0.09 percent of water soluble phosphoric acid ($P_2O_5$), 0.11 percent of fluorine and 0.10 percent of aluminum ($Al_2O_3$). The α-type hemihydrate gypsum was ground up to a specific surface area of about 3,000 cm$^2$/g and tested followed by the test number as shown in the Table 1.

The ground α-type hemihydrate gypsum was mixed strongly with 0.5 percent of dextrin (the addition amount shown hereinafter is indicated in per cent by weight referred to the α-type hemihydrate gypsum), 0.05 percent of sodium dodecylbenzenesulfonate, basic compound of alkali metal or alkaline earth metal and water soluble iron or aluminum salt in an amount as shown for each test number respectively in the table 1 and 60 parts of water per 100 parts of said α-type hemihydrate gypsum for 20 seconds in a pin-mixer at a rotation speed of 750 r.p.m., the resulting slurry was taken out to form a gypsum board of 9 mm thick by means

TABLE 1

| | Additives | | | | Slurry test | | | Test of gypsum board moldings | | | | |
|---|---|---|---|---|---|---|---|---|---|---|---|---|
| | Basic compound | | Water soluble iron or aluminum compound | | | Setting time (min.-sec.) | | Adhesion | | Bending strength (kg./cm.$^2$) | | |
| Test No. | Kind | Percent | Kind | Percent | pH | Initiation | Termination | Surface | Under-surface | Vertical | Horizontal | Note |
| 1 | Not used | | Not used | | 3.1 | 4-10 | 10-20 | 3 | 7 | 52 | 22 | Controls. |
| 2 | Ca(OH)$_2$ | 0.30 | do | | 6.3 | 13-20 | 21-30 | 1 | 8 | | | |
| 3 | Ca(OH)$_2$ | 0.07 | Fe$_2$(SO$_4$)$_3$ | 1.0 | 3.0 | 3-50 | 9-15 | 6 | 9 | 55 | 23 | |
| 4 | Ca(OH)$_2$ | 0.12 | Fe$_2$(SO$_4$)$_3$ | 1.0 | 4.5 | 1-15 | 2-45 | 8 | 9 | 62 | 28 | |
| 5 | Ca(OH)$_2$ | 0.22 | Fe$_2$(SO$_4$)$_3$ | 1.0 | 5.4 | 1-30 | 3-15 | 9 | 9 | 67 | 30 | Examples according to this invention. |
| 6 | Ca(OH)$_2$ | 0.32 | Fe$_2$(SO$_4$)$_3$ | 1.0 | 6.0 | 2-20 | 3-40 | 9 | 9 | 66 | 28 | |
| 7 | Ca(OH)$_2$ | 0.42 | Fe$_2$(SO$_4$)$_3$ | 1.0 | 8.1 | 5-10 | 10-00 | 6 | 8 | 55 | 24 | Controls. |
| 8 | Ca(OH)$_2$ | 0.62 | Fe$_2$(SO$_4$)$_3$ | 1.0 | 9.8 | 16-20 | 21-10 | 0 | 7 | | | |
| 9 | Ca(OH)$_2$ | 0.17 | Al$_2$(SO$_4$)$_3$ | 1.0 | 5.1 | 1-10 | 2-25 | 8 | 9 | 63 | 28 | |
| 10 | NaOH | 0.17 | Fe$_2$(SO$_4$)$_3$ | 1.0 | 4.6 | 1-40 | 4-20 | 9 | 9 | 64 | 29 | Examples according to this invention. |
| 11 | Na$_2$CO$_3$ | 0.22 | AlCl$_3$ | 1.0 | 4.5 | 1-45 | 3-00 | 9 | 9 | 63 | 29 | |

NOTE.—In the Table 1: (1) The percent is referred to α-type hemihydrate gypsum; (2) The aqueous Fe$_2$(SO$_4$)$_3$ having a content of 60% Fe$_2$(SO$_4$)$_3$, Al$_2$(SO$_4$)$_3$ 18 H$_2$O and AlCl$_3$ of guaranteed grade were used; (3) the setting time was determined according to the specification of Japanese Industrial Standard Method (JIS R9112); the initiation time (shown as initiation) is a time required from the beginning of the preparation of slurry to the time when the top of Vicat needle is stopped at a height of 1 mm. from the bottom of sample and the apparent termination time (shown as termination) is a time required from the beginning of the preparation of slurry to the time when the top of Vicat needle is stopped at a depth of 1 mm. from the surface of sample: (4) the adhesion in each test number is a mean value of three test samples which were cut from gypsum board moldings and tested according to the specification of Japanese Industrial Standard Method (JIS A6901) and the values shown in the column of adhesion for each test number are the lengths of parts of board paper (front and back surface) to the gypsum core where the length of break surface is 9.

of mold for the gypsum board test (40 cm × 50 cm), the adhesion and bending strength of moldings were determined and the results were shown in the table 1. The pH-values and setting times of said slurries were also given in the table.

As obviously seen from the table 1, according to this invention, the slurry setting time of α-type hemihydrate gypsum shows an initiation time of 1 to 3 minutes, more especially 1.5 to 2.5 minutes, and an apparent termination time of 2 to 6 minutes, more especially 2.5 to 4.5 minutes, these values being industrially preferably for the manufacture of gypsum board. The gypsum board prepared according to this invention shows also good values in the adhesion and bending strength.

Example 2

The same α-type hemihydrate gypsum as used in Example 1 was ground respectively up to the grinding degree as shown in the following table 2, the ground α-type hemihydrate gypsum was mixed respectively with 0.5 percent of dextrin, 0.27 percent of calcium hydroxide, 0.5 percent of iron sulfate and 60 parts of water per 100 parts of said α-type hemihydrate gypsum for 20 seconds in a pin-mixer at a rotation speed of 750 r.p.m. and the pH-value and setting time of the resulting aqueous slurry were determined respectively.

TABLE 2

| Test No. | Specific surface area of α-type hemihydrate gypsum (cm.$^2$/g.) | pH | Setting time (min.-sec.) Initiation | Setting time (min.-sec.) Termination |
| --- | --- | --- | --- | --- |
| 1 | 1,120 | 6.6 | 6-20 | 16-30 |
| 2 | 1,560 | 6.7 | 5-40 | 13-20 |
| 3 | 1,910 | 6.4 | 4-05 | 9-45 |
| 4 | 2,550 | 6.5 | 2-35 | 4-20 |
| 5 | 3,010 | 6.4 | 2-20 | 3-40 |
| 6 | 3,600 | 6.4 | 2-30 | 3-45 |
| 7 | 4,580 | 6.3 | 1-40 | 2-45 |

As obviously seen from the results in the table 2, if α-type hemihydrate gypsum by-produced in the manufacture of phosphoric acid is ground up to a specific surface area above 2,500 cm$^2$/g according to this invention, a slurry is obtained which has a preferred setting time for the manufacture of gypsum board.

What is claimed is:

1. A process for the manufacture of a gypsum board which comprises forming an aqueous slurry of α-type hemihydrate gypsum directly as obtained as by-product in the wet dihydrate-hemihydrate process of manufacturing phosphoric acid, in the presence of a metal ion selected from the group consisting of iron and aluminum ions, maintaining the pH of said slurry at a value of 4 to 7, and enclosing said slurry between two sheets of paper to form said gypsum board.

2. A process as claimed in claim 1 wherein a water-soluble salt of a metal selected from the group consisting of aluminum and iron is added as said metal ion to said hemihydrate gypsum in an amount of 0.3 to 3.0 parts by weight as hydrate of said salt per 100 parts by weight of said α-type hemihydrate gypsum.

3. A process as claimed in claim 1 wherein a water-soluble salt of a metal selected from the group consisting of aluminum and iron is added as said metal ion to said slurry in an amount of 0.3 to 3.0 parts by weight as hydrate of said salt per 100 parts by weight of said α-type hemihydrate gypsum.

4. A process as claimed in claim 1 wherein said pH value is maintained by adding a member selected from the group consisting of basic compounds of alkali metals and alkaline earth metals to said slurry.

5. A process as claimed in claim 1 wherein said α-type hemihydrate gypsum is ground to a specific surface area between 2,500 and 5,000 cm$^2$/g.

* * * * *